(12) United States Patent
Gustafson

(10) Patent No.: US 7,685,993 B2
(45) Date of Patent: Mar. 30, 2010

(54) LOW COST VARIABLE SWIRL

(75) Inventor: Richard Gustafson, Columbus, IN (US)

(73) Assignee: Cummins Inc., Indianapolis, IN (US)

( * ) Notice: Subject to any disclaimer, the term of this patent is extended or adjusted under 35 U.S.C. 154(b) by 53 days.

(21) Appl. No.: 12/059,944

(22) Filed: Mar. 31, 2008

(65) Prior Publication Data

US 2009/0241897 A1 Oct. 1, 2009

(51) Int. Cl.
F02B 31/00 (2006.01)
(52) U.S. Cl. .................. 123/308; 123/306; 123/90.15; 123/90.16
(58) Field of Classification Search .............. 123/308, 123/306
See application file for complete search history.

(56) References Cited

U.S. PATENT DOCUMENTS

| | | | |
|---|---|---|---|
| 4,669,434 A | | 6/1987 | Okumura et al. |
| 4,671,233 A | | 6/1987 | Iwashita et al. |
| 4,677,954 A | | 7/1987 | Ito et al. |
| 4,694,794 A | | 9/1987 | Kato et al. |
| 4,699,104 A | | 10/1987 | Okumura et al. |
| 4,703,729 A | | 11/1987 | Sakano et al. |
| 4,719,886 A | | 1/1988 | Kotani et al. |
| 4,748,950 A | | 6/1988 | Okumura et al. |
| 5,211,010 A | | 5/1993 | Hirota |
| 5,765,525 A | | 6/1998 | Ma |
| 5,870,984 A | * | 2/1999 | Hasegawa et al. ......... 123/90.18 |
| 6,276,323 B1 | * | 8/2001 | Nakagomi ............... 123/90.27 |
| 6,360,704 B1 | * | 3/2002 | Moriya et al. ............. 123/90.1 |
| 6,386,155 B2 | | 5/2002 | Moriya et al. |
| 6,397,800 B2 | | 6/2002 | Nohara et al. |
| 6,481,201 B2 | | 11/2002 | Kako et al. |
| 6,553,959 B2 | | 4/2003 | Xu et al. |
| 6,796,281 B2 | | 9/2004 | Shimoyama et al. |
| 6,805,095 B2 | | 10/2004 | Sun et al. |
| 6,901,744 B2 | | 6/2005 | Kako et al. |
| 2001/0050070 A1 | * | 12/2001 | Xu et al. ..................... 123/295 |
| 2002/0011068 A1 | | 1/2002 | Kako et al. |

(Continued)

FOREIGN PATENT DOCUMENTS

EP 0234478 B1 9/1987

(Continued)

OTHER PUBLICATIONS

"Notification of Transmittal of the International Search Report and the Written Opinion of the International Searching Authority, or the Declaration" dated Aug. 25, 2009; International application No. PCT/US2009/038945.

Primary Examiner—Stephen K Cronin
Assistant Examiner—Raza Najmuddin
(74) Attorney, Agent, or Firm—Studebaker & Brackett PC; Tim L. Brackett, Jr.; J. Bruce schelkopf

(57) ABSTRACT

Variable swirl for internal combustion engines. In one aspect, an apparatus includes a first intake valve controlling air flow from a first intake port to a piston cylinder of the internal combustion engine, where the first intake valve has a first lift profile. A second intake valve controls air flow from a second intake port to the piston cylinder, where the second intake valve has a second lift profile different than the first lift profile. The combination of first and second lift profiles causes a variable swirl of air in the cylinder as a function of engine speed.

12 Claims, 3 Drawing Sheets

U.S. PATENT DOCUMENTS

| | | |
|---|---|---|
| 2002/0194840 A1 | 12/2002 | Kako et al. |
| 2008/0035870 A1 | 2/2008 | Wygnanski et al. |

FOREIGN PATENT DOCUMENTS

| | | |
|---|---|---|
| EP | 0492989 A1 | 7/1992 |
| EP | 0492989 B1 | 7/1992 |
| EP | 1167726 A2 | 1/2002 |
| EP | 1167726 B1 | 1/2002 |
| EP | 1273778 B1 | 1/2003 |
| JP | 55-014914 A | 2/1980 |
| JP | 62087614 A | 4/1987 |
| JP | 02023225 A | 1/1990 |
| JP | 03067018 A | 3/1991 |
| JP | 03107525 A | 5/1991 |
| JP | 03-151510 A | 6/1991 |
| JP | 09250428 A | 9/1997 |
| KR | 10-2003-0092286 A | 12/2003 |
| KR | 10-2005-0044099 A | 5/2005 |

\* cited by examiner

LOW COST VARIABLE SWIRL

FIELD OF THE INVENTION

The present invention relates to internal combustion engines, and more particularly to variable swirl in internal combustion engine cylinders.

BACKGROUND OF THE INVENTION

Internal combustion piston engines include a piston connected to a crankshaft, where the piston is made to move in a cylinder by the timed expansion of gases in the cylinder. Two or more valves are provided for the cylinder to allow the intake and exhaust of gases, where these valves are opened and closed for appropriate times and durations to achieve the desired engine performance. For example, piston engines can use valves for intake and exhaust which are driven by rotating cams on a camshaft. The cams open the valves (lift) for a certain amount of time (duration) during each intake and exhaust cycle. The timing of the valve opening and closing is also important. The camshaft can be driven by the crankshaft through timing belts, gears or chains.

Swirl or tumble is the rotational flow of induced air inside the combustion cylinder of the engine which enhances the mixing of fuel and air and combustion products. The swirl can be generated, for example, by providing an intake port in a cylinder head in the tangential direction with respect to the corresponding cylinder to cause swirl in the cylinder, or by providing a shape of intake port that induces swirl in the port, such as a helical shape. A mixture of fuel can be input into the swirled air and ignited to achieve combustion in the cylinder. Different swirl characteristics can lead to different engine performance, such that different desired operation speeds of the engine may require different swirl characteristics. For example, in different circumstances or physical characteristics, swirl can affect detonation, emissions, fuel efficiency, and/or other engine performance.

Beneficial swirl tends to be a function of engine speed and other operating conditions. Thus, it is often desirable to have a controllable variable swirl in engine cylinders to tune the performance of the engine. For example, high speed diesel engines can benefit from having variable swirl ratios that depend on engine operating conditions.

Swirl can be controlled using the intake valves to the cylinders. Engines having two intake valves and two exhaust valves per cylinder can generate swirl by controlling the flow rate to one of the intake valves differently than to the other. The flow through one port can be changed, which tends to change the swirl in the cylinder. In previous designs, a separate solenoid and appropriate electronics, extra butterfly valve, or other mechanism, is provided in one of the intake ports and is used to reduce or modulate air flow through that port based on engine speed or other criteria, thus modifying the swirl based on those criteria. However, such additional required electronics and mechanisms add to the expense of manufacturing an engine.

Accordingly, a system and method for providing variable swirl at different engine speeds with reduced expense would be desirable in many applications.

SUMMARY OF THE INVENTION

The invention of the present application relates to variable swirl for internal combustion engines. In one aspect of the invention, an apparatus providing variable swirl in an internal combustion engine includes a first intake valve controlling air flow from a first intake port to a piston cylinder of the internal combustion engine, where the first intake valve has a first lift profile. A second intake valve controls air flow from a second intake port to the piston cylinder, where the second intake valve has a second lift profile different than the first lift profile. The combination of first and second lift profiles causes a variable swirl of air in the cylinder as a function of engine speed. A similar aspect is provided for a method for implementing similar features.

In another aspect, an engine includes a first intake port providing air flow to a piston cylinder and a second intake port providing air flow to the piston cylinder. A first intake valve is driven by a first cam to control air flow from the first intake port to the piston cylinder, where the first cam provides a first lift profile for the first intake valve. A second intake valve is driven by a second cam to control air flow from the second intake port to the piston cylinder, where the second cam provides a second lift profile different than the first lift profile to provide variable swirl in the cylinder based on current engine speed.

The present invention provides variable swirl for an internal combustion engine. The intake valves have different lift profiles to control the swirl, allowing a low cost solution to providing advantageous swirl characteristics.

DETAILED DESCRIPTION

The present invention relates to internal combustion engines, and more particularly to variable swirl in internal combustion engine cylinders. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular components provided in particular implementations. However, one of ordinary skill in the art will readily recognize that this apparatus will operate effectively in other implementations and applications. For example, the systems usable with the present invention can take a number of different forms.

To more particularly describe the features of the present invention, please refer to FIGS. 1-3 in conjunction with the discussion below.

Figure 1:
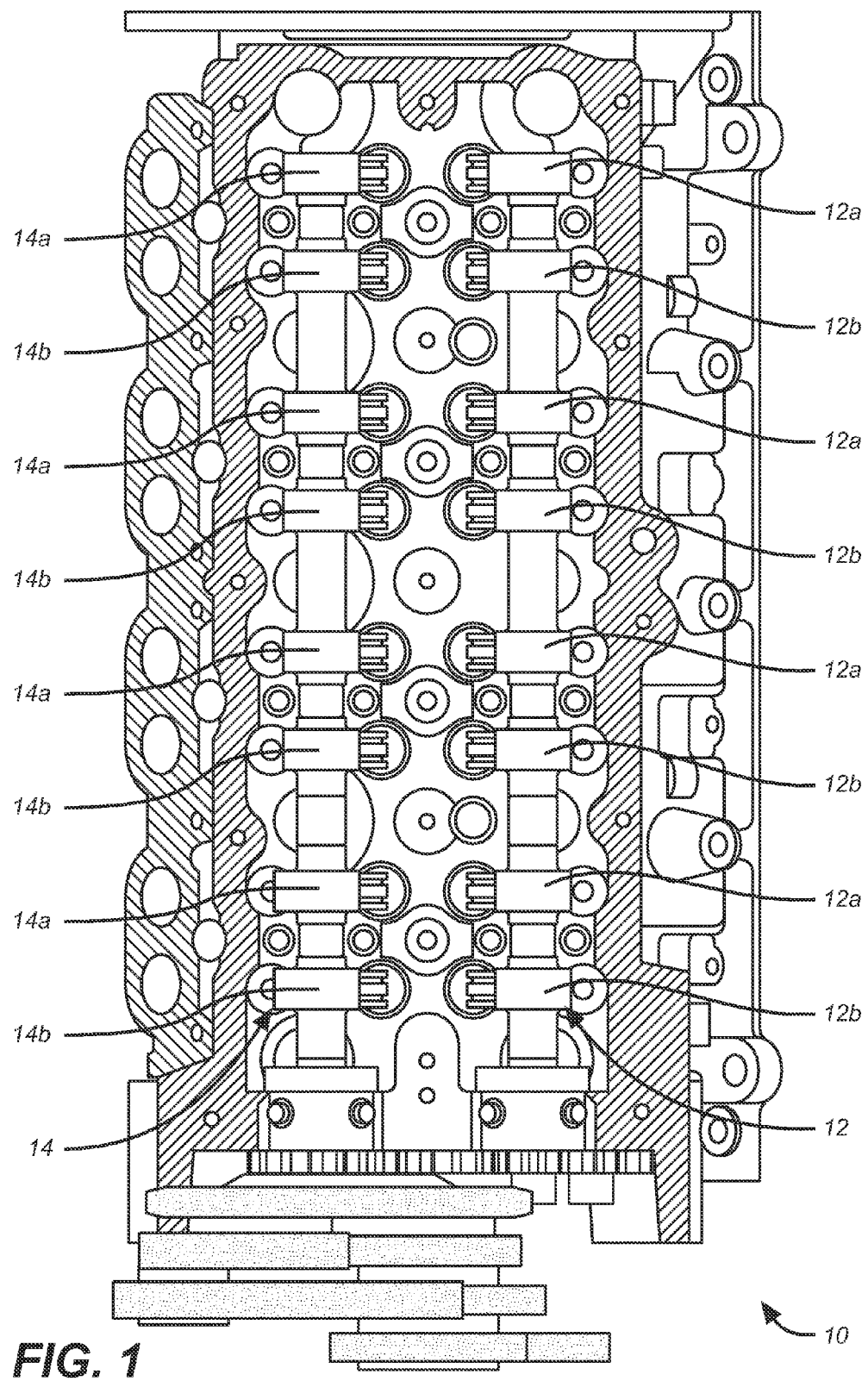
FIG. 1 is a top plan view of a portion of an internal combustion engine suitable for including the variable swirl feature of the present invention.

FIG. 1 is a top plan view of an engine portion 10 that is a portion of an internal combustion engine suitable for including the variable swirl feature of the present invention. The internal combustion engine of portion 10 can be used in a variety of applications, including automotive, off highway, power generation and marine (boat or ship) applications. In one useful application, the engine can be a standardized engine provided for use with a wide variety of different vehicles or other mechanisms. In the described embodiment shown, engine portion 10 is provided in a 16-valve dual overhead cam (DOHC) vehicle engine. In other embodiments, the present invention can be provided in many other types of engines.

In the described embodiment, engine portion 10 includes four cylinders, each cylinder provided with dual overhead cams 12a and 12b on the intake side, and dual overhead cams 14a and 14b on the exhaust side. Each cam 12 drives an intake valve that permits intake flow to the associated cylinder from the associated intake port. Each cam 12a drives a first intake valve for one intake port to the associated cylinder, while each cam 12b drives a second intake valve for a second intake port to the same cylinder.

In the described embodiment, the first intake port can be a different type than the second intake port. For example, the first intake port can be a direct (tangential) intake port, while the second intake port can be a helical intake port. The air flow through the helical intake port can affect the tangential intake port flow action, and thus affect the swirl in a cylinder. In other embodiments, the first intake port can be the same type of intake port as the second intake port. In still other embodiments, types other than helical and direct can be use with the invention. The configuration and structure of helical and direct intake ports is well known to those of skill in the art. Other embodiments can include different numbers of cylinders and other types of ports.

Similarly, each cam 14 drives an exhaust valve that permits exhaust flow from the cylinder to an associated exhaust port, where cams 14a drive exhaust valves for the first exhaust ports and cams 14b drive exhaust valves for the second exhaust ports.

Figure 2:
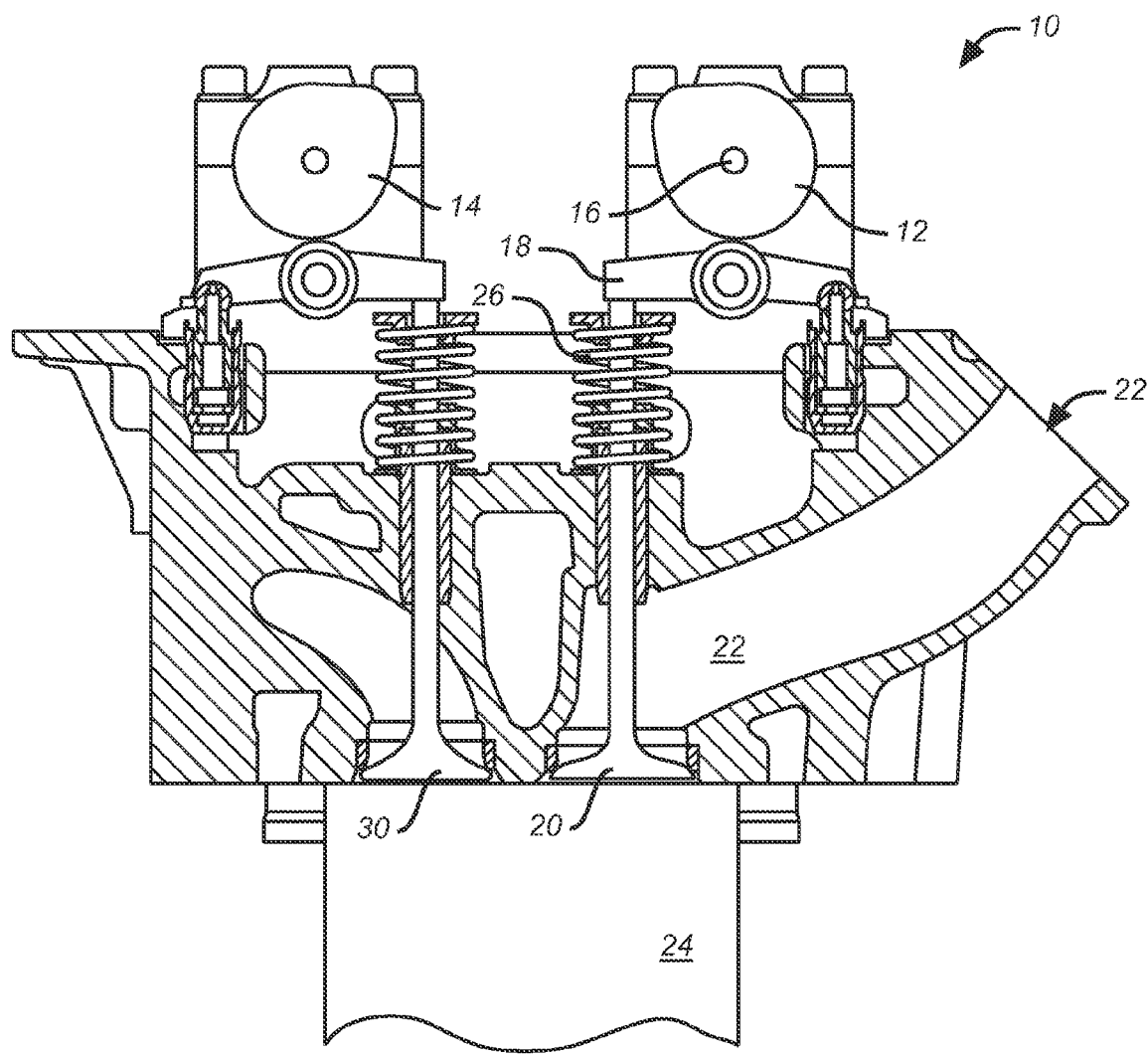
FIG. 2 is a side elevational cross-sectional view of the cylinder head portion of the engine portion 10 of FIG. 1.

FIG. 2 is a side elevational cross-sectional view of a cylinder head portion of the engine portion 10 of FIG. 1. One of the cams 12 is provided on a rotating camshaft 16 and presses on the member 18 to move the intake valve 20 down and let gas flow from the intake port 22 to the cylinder 24 below. In the example of FIG. 2, the first intake port is shown, as a direct (tangential) intake port. The cam 12 is shaped to have a particular shape or profile that causes the intake valve 18 to open according to that shape, e.g., those sections of the cam having an outer edge that is a longer distance to the axis of rotation of the camshaft 16 will cause the intake valve to move to a further open position. Shorter-radius sections of the cam causes the intake valve to move back closer to a closed position, when a spring 26 moves the intake valve 20 up to block the flow into the cylinder 24. The cam 14 operates similarly for the exhaust valve 30 to release gasses from the cylinder 24.

The cam 12 is shaped to a desired profile that opens the valve 20 to a desired lift (distance) and for a desired amount of time. One or more lobes on a cam, as well as other portions of the cam, can be shaped in different ways to provide desired valve operating characteristics, as is well known to those skilled in the art.

A similar mechanism can be provided for the second intake port, in use with the other intake valve cam 12, e.g. cam 12b. The second intake port is connected to the same cylinder 24 and a second intake valve similar to valve 20 is used to let airflow into the cylinder 24. According to one embodiment of the present invention, the cam 12b is shaped differently from the cam 12a, such as to achieve a different intake valve lift profile, as discussed in greater detail below with respect to FIG. 3. Different valve lift profiles can be achieved in other ways in other embodiments not utilizing cams 12 for controlling the intake valve lift profiles.

In other embodiments, other types of engines can use the present invention. For example, the two intake valves to the cylinder can each be independently driven by a mechanism and/or electronics different than cams. Some embodiments, for example, can include an electronic mechanism that opens and closes the intake valves for a desired lift distance and duration as controlled by a processor or other controller.

Figure 3:
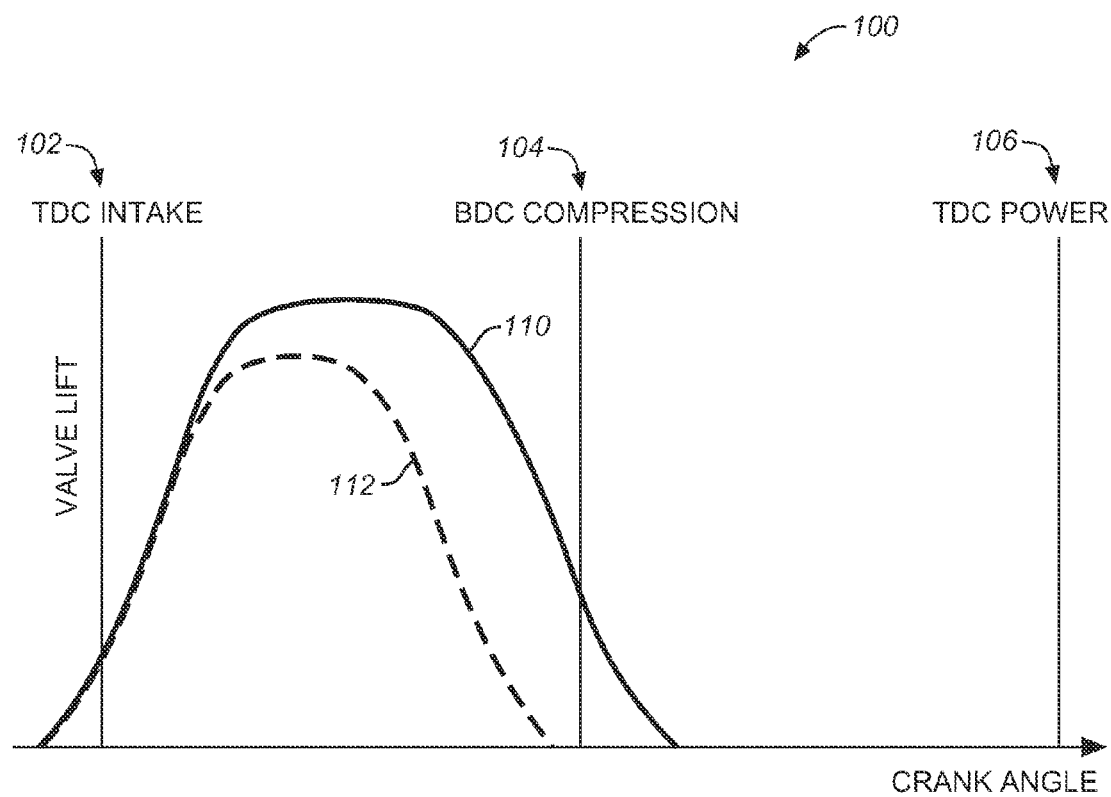
FIG. 3 is a graph illustrating lift profiles of the present invention for the motion of two intake valves to a cylinder.

FIG. 3 is a graph 100 showing lift profiles of the present invention for the motion of two intake valves to a cylinder 24, one intake valve for a first intake port to the cylinder, and the other intake valve for a second intake port to the same cylinder. In some embodiments, one intake port is of a different type than the other intake port. For example, the described embodiment provides a direct intake port and a helical intake port. The lift profiles are presented on a graph having a horizontal axis showing the crank angle related to the piston movement, i.e., the rotational position of the associated cam, and a vertical axis showing the intake valve lift, i.e., the distance the valve is opened from a closed position. A top dead center (TDC) intake position 102 is shown at the left, which indicates the position of the piston at the intake stage. A bottom dead center (BDC) compression position is shown, indicating the position of the piston at the compression stage (at the bottom of the cylinder). A TDC power position 106 is also shown at the right to indicate the position at the power (ignition) stage (an exhaust stage following the power stage is not shown).

Curve 110 shows a first lift profile indicating a standard intake valve event. At the TDC intake position 102, the intake valve has started to be opened as the cam's lobe contacts and pushes the valve mechanism. At the BDC compression position 104, the intake valve is almost full closed again; this provides optimum breathing of the engine at operating speeds.

Curve 112 shows a second lift profile that is different than the profile 110, where here the second lift profile indicates early intake valve closing (EIVC) event. At the ETDC intake position 102, the intake valve has started opening, similarly to the standard lift profile 110. However, before the BDC compression position 104 and before the equivalent position in profile 110, the valve in profile 112 is started to be closed and is fully closed by the BDC compression position 104. This valve lift profile allows more optimized breathing of the engine at very low engine speeds, but provides poor breathing characteristics at high engine speeds.

According to the present invention, one valve lift profile, such as profile 110, can be used for one intake port, while a different valve lift profile, such as profile 112, can be used for the second intake port to the same cylinder. In some embodiments, the first intake port is of a different type than the second intake port, where the "type" indicates the general shaping or manufacture of an intake port, e.g., helical, direct, etc. For example, in a dual overhead cam diesel engine, profile 110 can be used for the helical port intake valve and profile 112 can be used for the direct port intake valve to a cylinder. In other embodiments, the first intake port can be the same type as the second intake port.

The invention provides a different valve lift profile for each of the two intake valves to the cylinder. In the described embodiment, the cams 12a and 12b for each cylinder can be machined or otherwise shaped to have a shape and lobe providing the appropriate profile 110 or 112. Such machining of a cam to achieve a given lift profile is well known.

A valve lift profile such as profile 112 provides a cylinder air flow that is more engine speed sensitive. Cylinder volumetric efficiency is not as good at high engine speeds when using a cam providing curve 112. For example, when the engine speed is slow, the intake valve is opened longer and there is more time for air to flow into the cylinder, and most or all of the volume of the cylinder may be filled with air, when using either profile 112 or 110. At faster engine speeds, however, less air can fill the cylinder since the intake valve is opened for a shorter time. Since profile 112 has an earlier valve closing, the cylinder will not fill with air as much as it would when using profile 110, which allows more time for air intake due to a longer time for the valve being open. The velocity of the piston at the time the valve is closing causes this difference. Thus profile 112 is more engine speed sensitive than profile 110 in terms of the flow through its associated particular intake valve. Therefore, as engine speed goes higher, the flow through the engine drops to a greater degree when using profile 112 than when using profile 110.

The combination and interaction of the air flow from the ports generates the air flow and swirl. Combustion analysis and testing has shown a need for lower head port developed swirl at high engine speeds relative to lower speed conditions. In engines using direct and helical intake ports to a cylinder, a reduced air flow though the direct port relative to the helical port has been shown to reduce the overall swirl ratio in the cylinder (swirl ratio is the rotational speed of swirl divided by the engine speed). Therefore, if air flow to the direct port can be reduced at higher engine speeds relative to the helical port, it is possible to obtain lower swirl at these conditions. In the embodiment described above, the direct port has an early closing lift profile 112, and the helical port has a more standard intake lift profile 110. With early closing of the direct port valve, flow becomes engine speed sensitive with flow dropping more rapidly at higher engine speeds. Thus, with the configuration described above, helical port flow is relatively higher than direct port flow at higher engine speeds, resulting in lower swirl. At lower engine speeds, airflow is higher in the helical port relative to the direct port than at higher speeds, which increases the swirl. The present invention thus produces a variable swirl that is a function of engine speed.

The invention can thus produce variable swirl as a function of engine speed by providing different motion on one intake valve lift profile relative to the other intake valve. For example, different lift profiles can be employed for a first intake port relative to a second intake port in an engine having two intake ports per cylinder. This is straightforward to accomplish with, for example, dual overhead camshaft type engines. In a specific embodiment, a helical swirl port can be used in conjunction with a direct or tangential swirl port, each port having its own intake valve cam as described above, where an early closing intake cam lobe can be used for the direct port and a more standard intake lift profile can be used for the helical port. In various other embodiments, the intake ports can be oriented into the cylinder in different ways to affect swirl, and/or the shape the port(s) themselves can be changed to affect swirl.

The desired swirl change according to engine speed is accomplished in the present invention without the use of additional mechanisms, electronics, or moving parts. The mechanisms and/or electronics that normally move the intake valves, such as cams or other mechanisms, can be adjusted to change the timing and/or distance of the intake valve open events to provide variable swirl, without the additional mechanisms or parts. The invention thus allows a very low cost solution to provide advantageous swirl characteristics.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An apparatus providing variable swirl in an internal combustion engine, the apparatus comprising:
   a first intake valve controlling air flow from a first helical intake port to a piston cylinder of the internal combustion engine, wherein the first intake valve has a first lift profile; and
   a second intake valve controlling air flow from a second direct intake port to the piston cylinder, wherein the second intake valve has a second lift profile different than the first lift profile, such that the combination of first and second lift profiles causes a variable swirl of air in the cylinder as a function of engine speed, wherein the second lift profile opens said second intake valve for a shorter time than the opening of said first intake valve to reduce air flow to the cylinder at higher engine speeds to reduce swirl in the cylinder at the higher engine speeds.

2. The apparatus of claim 1 wherein a first cam is coupled to the first intake valve and provides the first lift profile for the first intake valve, and a second cam is coupled to the second intake valve and provides the second lift profile for the second intake valve.

3. The apparatus of claim 1 wherein the second lift profile provides an earlier intake valve closing relative to the intake valve closing provided by the first lift profile.

4. The apparatus of claim 3 wherein the second lift profile does not reduce air flow to the cylinder at lower engine speeds.

5. The apparatus of claim 1 wherein the internal combustion engine includes no additional mechanisms and electronics to control variable swirl at different engine speeds.

6. The apparatus of claim 1 wherein the internal combustion engine is a diesel engine.

7. The apparatus of claim 1 wherein the internal combustion engine is a dual overhead cam engine including a plurality of cylinders, wherein each cylinder of the engine includes the helical intake port, the direct intake port, and two exhaust ports.

8. An engine comprising:
   a first helical intake port providing air flow to a piston cylinder;
   a second direct intake port providing air flow to the piston cylinder;
   a first intake valve driven by a first cam to control air flow from the first intake port to the piston cylinder, wherein the first cam provides a first lift profile for the first intake valve; and
   a second intake valve driven by a second cam to control air flow from the second intake port to the piston cylinder, wherein the second cam provides a second lift profile for the second intake valve that is different than the first lift profile to provide variable swirl in the cylinder based on current engine speed, wherein the second lift profile opens said second intake valve for a shorter time than the opening of said first intake valve to reduce air flow to the cylinder at higher engine speeds to reduce swirl in the cylinder at the higher engine speeds.

9. The engine of claim 8 wherein the second lift profile providing an earlier intake valve closing relative to the first lift profile to provide variable swirl in the cylinder based on current engine speed, wherein the second lift profile reduces air flow to the cylinder at higher engine speeds to reduce swirl in the cylinder at the higher engine speeds.

10. A method for providing variable swirl in an internal combustion engine, the method comprising:

providing a first lift profile for a first intake valve controlling air flow from a first helical intake port to a piston cylinder of the internal combustion engine; and providing a second lift profile for a second intake valve controlling air flow from a second direct intake port to the piston cylinder, the second lift profile being different than the first lift profile, such that the combination of first and second lift profiles causes a variable swirl of air in the cylinder as a function of engine speed, wherein the second lift profile opens said second intake valve for a shorter time than the opening of said first intake valve to reduce air flow to the cylinder at higher engine speeds to reduce swirl in the cylinder at the higher engine speeds.

11. The method of claim 10 wherein the second lift profile provides an earlier intake valve closing relative to the intake valve closing provided by the first lift profile.

12. The method of claim 11 wherein the second lift profile does not reduce air flow to the cylinder at lower engine speeds.

* * * * *